Figure 1:
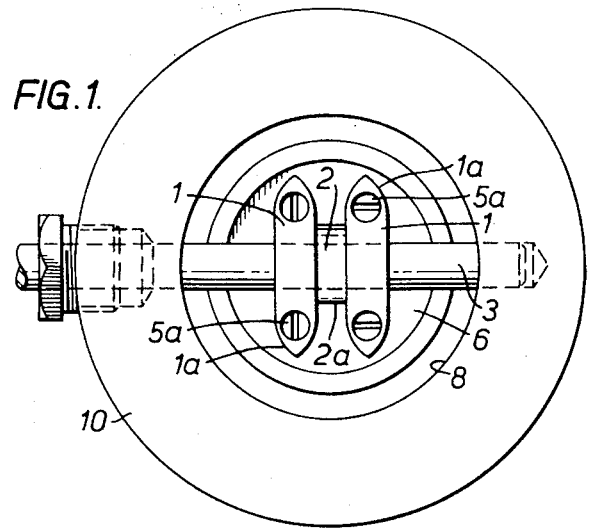

United States Patent

[11] 3,583,669

| [72] | Inventors | Alan Eric Topham<br>19 Kingston Road;<br>Cedric Henry Topham, Woodlands View<br>Grindale Road, Boynton, both of<br>Bridlington, Yorkshire, England |
|---|---|---|
| [21] | Appl. No. | 827,308 |
| [22] | Filed | May 23, 1969 |
| [45] | Patented | June 8, 1971 |
| [32] | Priority | May 25, 1968 |
| [33] | | Great Britain |
| [31] | | 25,119/68 |

[54] VALVES FOR CONTROLLING FLUID FLOW
2 Claims, 3 Drawing Figs.

[52] U.S. Cl. .................................................. 251/163, 251/308
[51] Int. Cl. ..................................................... F16k 13/02
[50] Field of Search .......................................... 137/377, 536, 625.27; 251/188, 163, 308, 158

[56] References Cited
UNITED STATES PATENTS
2,977,989  4/1961  Meynell ........................ 137/625.27X FOREIGN PATENTS
793,107  4/1958  Great Britain ................. 251/188

Primary Examiner—Harold W. Weakley
Attorney—Watson, Cole, Grindle & Watson

ABSTRACT: A quick-acting valve is provided of the kind in which a stopper cooperating with a seating in the valve body bore is carried by spring-loading means on an operating spindle extending across the back of the stopper and across the bore of the valve body, the spindle carrying a cam coacting with the back of the stopper for effecting quick opening and closing rotation of the latter bodily with the spindle and also initial lifting and final seating movement of the stopper. The spring-loading means comprises compression springs about headed projections extending from the back of the stopper into corresponding bores in crosspiece means carried by the spindle whereby the springs coact between the projections and crosspiece means and are wholly and protectively accommodated within the latter.

PATENTED JUN 8 1971 3,583,669

INVENTORS:-
ALAN ERIC TOPHAM
CEDRIC HENRY TOPHAM.

By Watson, Cole, Grindle & Watson
ATTORNEYS

VALVES FOR CONTROLLING FLUID FLOW

This invention has reference to valves for controlling fluid flow more particularly quick-acting valves of the type wherein the valve member or stopper is carried by spring-loading means on an operating spindle which extends transversely across the bore of the valve body and across the back of the stopper at right angles to the axis of the latter, the spring means urging the back of the stopper against cam means mounted on the spindle whereby on initial rotation of the spindle the cam coaction with the back of the stopper is such that the spring means urges the stopper towards the spindle to initially lift said stopper from its seating in the valve body, whilst further rotation of the spindle carries the stopper round with it to effect quick opening of the valve and conversely quick closing thereof when the spindle is rotated in the opposite direction.

The invention is concerned in particular with providing an improvement in the spring-loading means or assembly in or for a valve of the above-defined type in which as set forth in the prior patent specification aforesaid the spring-loading means consists of crosspiece means disposed, or adapted to be disposed, to bear across the operating spindle adjacent the cam means thereon and on that side of the spindle remote from the back of the valve member or stopper, said crosspiece means slidably engaging by its end portions headed screws or like projections extending or adapted to extend from the back of the stopper at each side of the spindle, whilst spring means is provided in the form of compression springs acting between heads or abutments on said screws or the like and the end portions of the crosspiece means whereby the back of the stopper is urged against the cam means.

Figure 2:
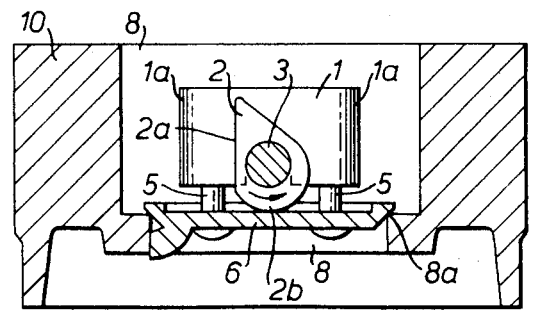
Figure 3:
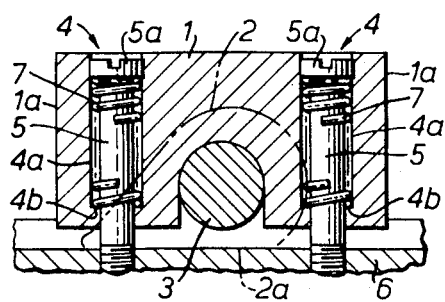

In a practical embodiment of the invention the construction and arrangement is as follows, reference being had to the accompanying drawings in which:

FIGS. 1 and 2 are plan and axial plane section views respectively of a valve of the type referred to provided with crosspiece means in accordance with this invention and FIG. 3 is a detail sectional view of one of the crosspieces on an enlarged scale.

The crosspiece means is shown consisting of a pair of crosspieces 1 each side of the cam 2 on the operating spindle 3 carried by the valve body 10 whilst each crosspiece 1 is shown of narrow block form provided with a bore 4 adjacent each end, the parallel bores 4 so provided each receiving a headed screw 5 screwed into the back of the valve member or stopper 6.

Each bore 4 in the crosspiece block 1 is mainly counterbored at 4a to accommodate a compression spring 7 acting between the head 5a of the screw 5 and a shoulder 4b at the other end of the counterbore 4a so that the crosspiece 1 is spring urged to bear against the operating spindle 3 across which it is disposed. The back of the stopper 6 is thus urged against the periphery of the cam 2 for operation of the valve in the manner already referred to.

Thus on the operating spindle 3 being rotated in a direction to bring the flat 2a of the cam 2 against the back of the stopper 6 initial lifting of the latter from its seating 8a is able to take place under the action of the springs 7 acting between the screw heads 5a and the crosspiece shoulders 4b. On further rotation of the spindle 3, the stopper 6 turns bodily with the spindle owing to its location against the cam flat 2a and thus effects quick opening of the valve. Conversely rotation of the spindle 3 in the opposite direction effects quick closing of the valve and final seating of the stopper 6 as the cam 2 turns relative to it to cause the eccentric rounded portion 2b to bear against the back of the stopper 6.

The fact that the screws 5 and compression springs 7 are accommodated or enclosed in their respective crosspieces 1 together with the smooth and clean exterior form of the latter results in considerably reduced resistance to fluid flow through the valve bore 8 and also somewhat less turbulence in such flow. In this connection and as shown in FIG. 1 the ends 1a of the crosspieces 1 are of bow shape or may be otherwise suitably faired or formed in order to provide streamlining of each crosspiece 1 for minimizing resistance to fluid flow and turbulence in the latter. As will also be evident from FIG. 1 the form of each crosspiece 1 enhances and neatens the appearance of the spring loading means or assembly.

In addition to the above-mentioned advantages the complete enclosure or housing of the springs 7 and corresponding portions of the screws 5 by each crosspiece 1 results in their protection from scale, dirt or other impurities in fluid passing through the valve whilst the springs 7 are contained in situ by their crosspiece bores 4 in the event of fracture of a spring 7 occurring thus enabling operation of the valve to continue.

Particularly where each crosspiece 1 is of the block or solid form shown, it has considerable strength to withstand the action of powerful spring loading which may consist of coil compression springs 7 as shown or may be of other suitable forms such as Belleville washers.

If desired the crosspieces or blocks 1, 1 may be integrally or otherwise united to provide crosspiece means accommodating the cam 2.

We claim:

1. A valve of the character described comprising a valve body having an annular seating coaxially disposed in a bore thereof; a disclike stopper in said bore and cooperating with said seating; an operating spindle rotatably carried by said valve body and extending across the bore thereof and across the back of the stopper; a cam rotationally fast with the operating spindle and arranged for coaction with the back of the stopper, said cam having a flat portion and an eccentric rounded portion which flat portion coacts with the back of the stopper for imparting opening and closing swinging movement to the latter on corresponding rotation of the operating spindle while the rounded portion coacts with the back of the stopper for effecting initial opening lifting movement of said stopper and final closing seating movement thereof; headed projections extending from the back of the stopper at each side of the cam and spindle; a pair of crosspiece blocks carried by the spindle one at each side of the cam, said blocks correspondingly receiving and wholly accommodating in separate counterbored bores therein said headed projections together with compression spring means about said projections and which act between the heads of the latter and the blocks, said blocks being of faired end form in order to be streamlined in relation to fluid flow through the valve.

2. A valve as defined in claim 1 in which the head of each said projection has a sliding fit in and substantially closes its respective bore.